United States Patent
Reinartz

[11] 3,737,011
[45] June 5, 1973

[54] ADJUSTING DEVICE FOR BRAKE LININGS OF FRICTION BRAKES

[75] Inventor: Hans-Dieter Reinartz, Frankfurt-Hausen, Germany

[73] Assignee: ITT Industries, Inc., New York, N.Y.

[22] Filed: Feb. 16, 1972

[21] Appl. No.: 226,777

[30] Foreign Application Priority Data

Mar. 13, 1971   Germany.................P 21 12 241.8

[52] U.S. Cl. .....................188/196 BA, 188/79.5 GE
[51] Int. Cl.............................................F16d 65/56
[58] Field of Search ....................188/71.9, 79.5 GE, 188/196 F, 196 B, 196 A, 196 D

[56] References Cited
UNITED STATES PATENTS

| | | | |
|---|---|---|---|
| 2,889,896 | 6/1959 | Schulz et al.....................188/196 BA |
| 3,334,713 | 8/1967 | Russell............................188/196 BA |
| 3,361,232 | 1/1968 | Engle...............................188/196 BA |
| 3,498,423 | 3/1970 | Belart..............................188/196 F |

*Primary Examiner*—Duane A. Reger
*Attorney*—C. Cornell Remsen, Jr., Walter J. Baum and Philip M. Bolton

[57] ABSTRACT

This invention relates to a brake lining clearance adjusting device capable of being used in drum brakes and disc brakes. Compared with existing adjusting devices, the present adjusting device saves space, is less expensive to manufacture and has an easy operating motion. The torque of the back rotation after adjustment does not change the adjustment made. An adjusting spindle which has one end thereof secured to a piston has an adjusting nut threaded thereon, the piston, spindle and nut being disposed coaxially of the longitudinal axis of a cylinder. The first piston has extending therefrom a cylindrical projection which is disposed coaxially of the longitudinal axis and spaced from the inner surface of the cylinder with its end remote from the first piston slidably engaging the inner surface of the cylinder. The cylindrical projection includes a guideway therethrough having a first portion which is included at a given angle with respect to the longitudinal axis. A catch ring is disposed coaxially of the adjusting nut and in a sliding relation with the inner surface of the cylindrical projection and includes thereon a guide pin engaging the guideway. One end of the catch ring is spaced from a conical portion of the adjusting nut by an amount equal to the desired brake lining clearance. A friction ring is disposed coaxially of the adjusting nut in contact with the other end of the catch ring and in a friction contact with the inner surface of the cylindrical projection. During an adjusting step the end of the catch ring frictionally engages the conical portion of the adjusting nut and through means of the guideway causes rotation of the nut with respect to the spindle to provide the desired adjustment. The friction ring, after an adjustment is made, cooperates in preventing rotation of the adjusting nut to prevent any change in the adjustment made.

9 Claims, 2 Drawing Figures

3,737,011

ADJUSTING DEVICE FOR BRAKE LININGS OF FRICTION BRAKES

BACKGROUND OF THE INVENTION

The invention relates to an adjusting device for the brake linings of friction brakes with a pressure element (piston) disposed in a cylinder and displaceable in relation to an adjusting spindle, said adjusting spindle having an adjusting nut threaded thereon.

German Patent No. 1,203,622 discloses a self-adjusting device for the brake linings of friction brakes which is provided with a threaded bolt which is untwistably connected with a brake shoe and on which a threaded sleeve is twistable. The circumference of the sleeve is provided with a gear rim which is engaged by a ratchet supported by a fixed part of the brake shoe. This adjusting device is disadvantageous in that it is relatively large and expensive to manufacture. A further disadvantage is the fact that its adjustment is effected in relatively large steps only, i.e., by one ratchet at a time.

SUMMARY OF THE INVENTION

It is an object of the present invention to provide an adjusting device of particularly easy operating motion where the brake clearance is restored after any adjusting step such that the torque of the back-rotation which results with comparable prior art devices does not have any reaction on the adjustment just accomplished. Finally, the adjusting device consists of a few and simple components to enable a compact construction and to be applicable for both drum brakes and disc brakes.

A feature of the present invention is to provide an adjusting device for the brake linings of friction brakes comprising: a cylinder having a longitudinal axis; a first piston disposed coaxially of the axis and in a slidable sealed relationship with the inner surface of the cylinder; a cylindrical projection extending from the first piston coaxially of the axis having a given length thereof adjacent the piston spaced from the inner surface of the cylinder and the end thereof remote from the first piston slidably engaging the inner surface of the cylinder, the cylindrical projection including a guideway therethrough, the guideway having a first portion which is inclined at a given angle with respect to the axis, the first portion being disposed in at least the given length; an adjusting spindle disposed coaxially of the axis within the cylindrical projection, the spindle having threads on the outer surface thereof and having one end thereof slidably secured to an aperture in the internal end face of the first piston; an adjusting nut threaded onto the spindle disposed within the cylindrical projection coaxially of the axis, the nut having a conical outer surface portion adjacent the first piston; a catch ring disposed coaxially of the nut and in a sliding relationship with the inner surface of the cylindrical surface, the catch ring having an end thereof spaced from the conical portion an amount equal to a desired clearance for the brake lining and a guide pin engaging the first portion of the guideway; and a friction ring disposed coaxially of the nut in contact with the outer end of the catch ring and in a friction contact with the inner surface of the cylindrical projection, the friction ring being rotatable with respect to the catch ring; whereby movement of the piston relative to the cylinder and the adjusting nut causes the one end of the catch ring to engage the conical portion of the adjusting nut and thereby rotate the adjusting nut on the spindle to provide the desired clearance, the amount of rotation of the adjusting nut being controlled by the given angle of the first portion of the guideway and the threads of the spindle.

Another feature of the present invention is that the friction ring is preferably in friction contact with the cylindrical projection of the pressure element (piston) by means of at least one spring ring disposed in an annular groove on the outer surface of the friction ring, the cylindrical projection of the pressure element guiding the friction ring. After each adjusting operation the friction ring will be moved back into its initial position relative to the adjusting nut by means of the catch ring disposed on the adjusting nut.

Still another feature of the present invention is to prevent the guide pin from moving uncontrolled to and fro in the guideway upon a shock. This is accomplished by holding the guide pin preferably by a helical spring surrounding the outer surface of the cylindrical projection of the pressure element. This helical spring is further employed to ensure that the guide pin abuts the guideway unilaterally without play, thereby preventing undesired variations in the desired brake lining clearance.

A further feature of the present invention is that the operations of overcoming the clearance, the adjustment, the restoring of the clearance and the return of the catch ring into its initial position are separated from one another. This clear separation of the individual operations ensures that the adjusting nut just adjusted will not rotate back.

According to another feature of the present invention, due to the slight inclination of the guideway and to the slight ascent within the adjusting nut, an easy axial adjustment of the adjusting nut can be obtained which will correspond to but a fraction of the axial brake lining wear. The small thread diameter of the adjusting spindle provides a small frictional torque acting on the adjusting nut. Thus, there can be dispense with a safety device protecting against twisting of the pressure element.

Still a further feature of the present invention is that when the adjustment is completed and the clearance is restored, the sprint ring will indirectly prevent an immediate back-rotation of the adjusting nut into its old position by means of the stop ring. The torque of the back-rotation exerted by means of the guideway on the guide pin will be retransmitted onto the cylindrical projection of the pressure element which includes the guideway, said retransmission being caused by means of the spring ring. Therefore, it is only with great difficulty that the torque of the back-rotation can act on the adjusting nut via the stop ring fixed at an end of the adjusting nut.

In a preferred embodiment of the present invention it is only in the first portion of the guideway, where the guideway is disposed at a slanting angle with respect to the longitudinal axis of the adjusting device, that a certain small adjusting step will result. The guideway also includes a second portion which will be in a parallel relation with the longitudinal axis of the adjusting device and no additional adjustment will be possible in this portion of the guideway. An alternative guideway would be a curved or kinked guideway having a tangent line to one terminal thereof, which lies in the cylindrical projection's front surface, in a parallel relation with the longitudinal axis of the adjusting device and the tangent line of the other terminal of the guideway running at an inclined angle with respect of the longitudinal axis of the adjusting device.

Another feature of the present invention is to provide the adjusting nut as part of a second pressure element coaxially disposed with respect to the longitudinal axis of the adjusting device and in tandem relation with the first pressure element, the second pressure element moving relative to the cylinder and the first pressure element during the braking operation.

According to still another feature of the present invention all the components of the adjusting device are arranged in a pressure chamber filled with brake pressure medium which ensures a constant lubrication and an absolute protection against outside influences. The compact structure of the adjusting device permits assembly in both drum and disc brakes.

According to a further feature of the present invention the pressure elements may also be moved by a mechanically working device, such as an expanding device rather than by the build up of hydraulic pressure in the chamber between the two pressure elements, for the braking and adjusting operation.

BRIEF DESCRIPTION OF THE DRAWING

Above-mentioned and other features and objects of this invention will become more apparent by reference to the following description taken in conjunction with the accompanying drawing in which.

DESCRIPTION OF THE PREFERRED EMBODIMENT

Figure 1:
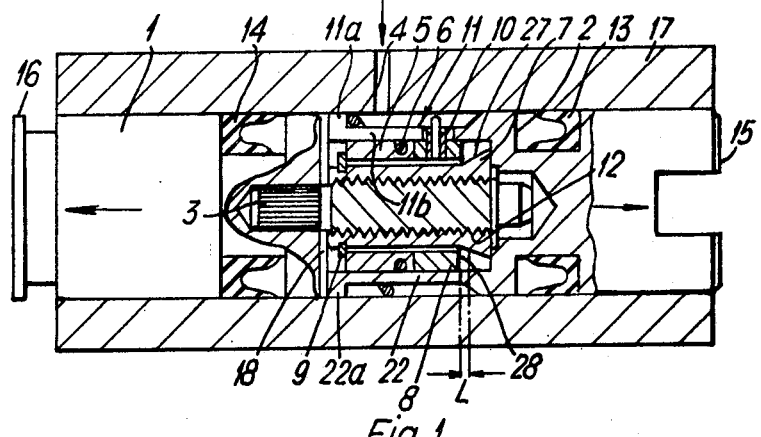
FIG. 1 shows the longitudinal cross sectional view, partially in elevation, of an adjusting device with two pressure elements which are moved relative to each other in accordance with the principles of the present invention.

According to FIG. 1 the adjusting device is assembled in the cylinder 17 of a drum brake. The pressure medium chamber 18 filled with brake fluid or brake pressure medium from the master cylinder is formed by cylinder 17 and two pistons 1 and 2. One end of an adjusting spindle 3 with a fine thread 12 thereon is assembled in a fixed non-rotating relation with an aperture formed in the right-hand front wall of piston 1. Adjusting nut 7 is threaded on and disposed in a coaxial relation with spindle 3. One end of nut 7 has its outer surface formed as a conical portion 27 and the other end of nut 7 is provided with an annular groove for retaining ring 9. Piston 2 envelops adjusting spindle 3 and the adjusting nut 7 by means of its cylindrical projection 22, said projection 22 being fixed to the internal front surface of piston 2. Cylindrical projection 22, at about the position of adjusting nut 7, is provided with a guideway 11. Catch ring 8 is disposed coaxially of nut 7 and in an axial and rotating sliding relation to the inner surface of projection 22. Friction ring 5 is disposed coaxially of nut 7 and in abutment with one end of catch ring 8. Friction ring 5 is in a frictional axial and rotating relation to the inner surface of projection 22. The outer surface of the catch ring 8 is provided with a guide pin 10 which engages guideway 11 of cylindrical projection 22. The outer surface of friction ring 5 is provided with an annular groove and spring ring 6 disposed in this annular groove to enhance the friction contact between friction ring 5 and the inner surface of projection 22. The collar seals 13 and 14 seal the pressure medium chamber.

Figure 2:
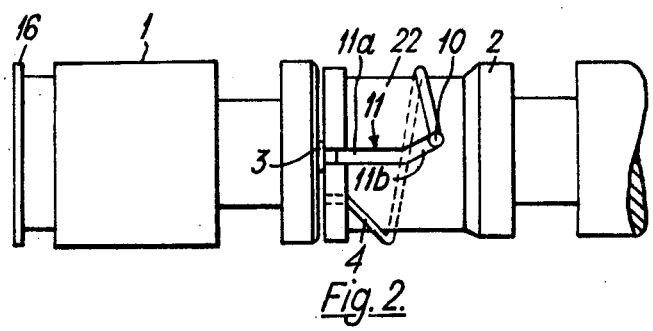
FIG. 2 shows the side elevational view of the adjusting device with the cylinder removed.

FIG. 2 shows the side view of the adjusting device with cylinder 17 removed. The guideway 11 includes two portions 11a and 11b. Guideway portion 11a is disposed on projection 22 in a parallel relation with respect to the longitudinal axis of the adjusting device. Portion 11a is approximately half the length of guideway 11. After a bend or kink in guideway 11 there is provided guideway portion 11b which is disposed at an inclined angle with respect to the longitudinal axis of the adjusting device through the side surface of projection 22. Helical spring 4 surrounds the outer surface of projection 22 having one end thereof held in position by radially extending portion 22a. The other end of helical spring 4 is inserted into or otherwise secured to guide pin 10 to ensure that guide pin 10 is always in abutment with guideway 11.

The operation of the adjusting device is as follows:

When the pressure in the pressure medium chamber 18 is increased, due to the actuation of the master cylinder, pistons 1 and 2 are moved apart. Spindle 3 is in an axially sliding relation with respect to the central aperture in the internal face of piston 2 with adjusting nut 7 moving out of projection 22. After overcoming of the brake clearance defined by "L" the edge 28 of catch ring 8 will abut against the conical portion 27 of the adjusting nut 7. Due to the resulting circular-arc-shaped contact of lines and due to the force exerted by friction ring 5 against displacement, the friction between adjusting nut 7 and catch ring 8 is so great that they can be considered as one piece. When pistons 1 and 2 part still further, pin 10, — since it engages guideway 11, effects a twisting of adjusting nut 7 on adjusting spindle 3 which is secured against twisting in piston 1. The fine thread 12 is adapted to the angle of inclination of portion 11b of guideway 11 such that only a fraction of the lining wear to be adjusted will be adjusted upon each braking or adjusting operation.

If due to the thermal expansion of the brake drums, as occurs results during prolonged down-hill driving, a larger stroke of pistons 1 and 2 is required, guide pin 10 will slide in portion 11a of guideway 11. Thus, a further rotation of catch ring 8 and, hence, a further adjustment is prevented, said further adjustment no longer corresponding to the actual brake lining attrition.

When the brake pressure in pressure medium chamber 18 decreases, pistons 1 and 2 are pressed towards each other via the front surfaces 15 and 16 by means of the shoe spring of a drum brake (not shown). Hence, catch ring 8 will move away from conical portion 27 of adjusting nut 7. During this releasing operation, the pressure in the pressure medium chamber 18 decreasing, a possibly ensuing return motion of adjusting nut 7 due to guide pin 10 and catch ring 8 of each action is prevented by means of the increasing reaction friction force of friction ring 5. The outer surface of friction ring 5 will have friction contact with the inner surface of projection 22 by means of spring ring 6 disposed in the annular groove. At the front surface adjacent the catch ring 8, friction ring 5 rests on the spring ring 6. The other front surface of friction ring 5 will be in contact with retaining ring 9 (stop ring) after the disconnecting of the conical connection of adjusting nut 7 and catch ring 8 and after the restoring of the desired brake lining clearance.

The retaining ring 9 will axially displace friction ring 5 together with catch ring 8 until adjusting nut 7 abuts piston 2. In doing so, the two adjacent end surfaces of friction ring 5 and catch ring 8 will have friction contact, since spring ring 6 secures friction ring 5 against twisting or rotating.

Because of the fine motion and the correlating easy twistability of fine thread 12, an additional safety device against twisting of pistons 1 and 2 can be dispensed with.

While I have described above the principles of my invention in connection with specific apparatus it is to be more clearly understood that this description is made only be way of example and not as a limitation to the scope of my invention as set forth in the objects thereof and in the accompanying claims.

I claim:

1. An adjusting device for the brake linings of friction brakes comprising:
    a cylinder having a longitudinal axis;
    a first piston disposed coaxially of said axis and in a slidable sealed relationship with the inner surface of said cylinder;
    a cylindrical projection extending from said first piston coaxially of said axis having a given length thereof adjacent said piston spaced from the inner surface of said cylinder and the end thereof remote from said first piston slidably engaging the inner surface of said cylinder, said cylindrical projection including a guideway therethrough, said guideway having a first portion which is inclined at a given angle with respect to said axis, said first portion being disposed in at least said given length;
    an adjusting spindle disposed coaxially of said axis within said cylindrical projection, said spindle having threads on the outer surface thereof and having one end thereof slidably secured to an aperture in the internal end face of said first piston;
    an adjusting nut threaded onto said spindle disposed within said cylindrical projection coaxially of said axis, said nut having a conical outer surface portion adjacent said first piston;
    a catch ring disposed coaxially of said nut and in a sliding relationship with the inner surface of said cylindrical surface, said catch ring having an end thereof spaced from said conical portion an amount equal to a desired clearance for said brake lining and a guide pin engaging said first portion of said guideway; and
    a friction ring disposed coaxially of said nut in contact with the outer end of said catch ring and in a friction contact with the inner surface of said cylindrical projection, said friction ring being rotatable with respect to said catch ring;
    whereby movement of said piston relative to said cylinder and said adjusting nut causes said one end of said catch ring to engage said conical portion of said adjusting nut and thereby rotate said adjusting nut on said spindle to provide said desired clearance, the amount of rotation of said adjusting nut being controlled by said given angle of said first portion of said guideway and said threads of said spindle.

2. A device according to claim 1, wherein said friction ring includes,
    at least one angular groove disposed in the outer surface of said friction ring, and
    a spring ring disposed in said annular groove to enhance the friction contact between said friction ring and the inner surface of said cylindrical projection.

3. A device according to claim 1, further including a helical spring disposed about the outer surface of said cylindrical projection along said given length thereof and engaging said guide pin to hold said guide pin in said guideway.

4. A device according to claim 1, wherein said guideway further includes
    a second portion disposed on said cylindrical projection in a parallel relationship to said axis.

5. A device according to claim 1, further including a second piston disposed coaxially of said axis and in a sealed sliding relationship with the inner surface of said cylinder, said second piston having an aperture therein disposed coaxially of said axis to receive in a fixed relationship the other end of said spindle.

6. A device according to claim 5, wherein said cylindrical projection, said adjusting spindle, said adjusting nut, said catch ring, and said friction ring are disposed in a chamber filled with a brake pressure medium, said chamber being formed by said cylinder and said first and second pistons.

7. A device according to claim 1, further including an annular groove in the outer periphery of said nut adjacent the end thereof remote from said conical portion, and
    a retaining ring disposed in said groove to provide a stop for said friction ring.

8. A device according to claim 1, wherein said friction ring includes
    at least one first annular groove disposed in the outer surface of said friction ring, and
    a spring ring disposed in said first annular groove to enhance the friction contact between said friction ring and the inner surface of said cylindrical projection;
    said guideway further includes
    a second portion disposed on said cylindrical projection in a parallel relationship to said axis; and
further including
    a helical spring disposed about the outer surface of said cylindrical projection along said given length thereof and engaging said guide pin to hold said guide pin in said guideway;
    a second piston disposed coaxially of said axis and in a sealed slidable relationship with the inner surface of said cylinder having an aperture therein disposed coaxially of said axis to receive in a fixed relationship the other end of said spindle;
    a second annular groove in the outer surface of said nut adjacent the end thereof remote from said conical portion; and
    a retaining ring disposed in said second groove to provide a stop for said friction ring.

9. A device according to claim 8, wherein said cylindrical projection, said adjusting spindle, said adjusting nut, said catch ring, and said friction ring are disposed in a chamber filled with a brake pressure medium, said chamber being formed by said cylinder and said first and second pistons.

* * * * *